United States Patent
Sprigg et al.

(10) Patent No.: US 7,921,287 B2
(45) Date of Patent: Apr. 5, 2011

(54) APPLICATION LEVEL ACCESS PRIVILEGE TO A STORAGE AREA ON A COMPUTER DEVICE

(75) Inventors: Stephen A. Sprigg, Poway, CA (US); Laurence Lundblade, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 892 days.

(21) Appl. No.: 10/218,430

(22) Filed: Aug. 13, 2002

(65) Prior Publication Data

US 2003/0061504 A1    Mar. 27, 2003

Related U.S. Application Data

(60) Provisional application No. 60/312,177, filed on Aug. 13, 2001.

(51) Int. Cl.
*H04L 29/06* (2006.01)
(52) U.S. Cl. .......................... 713/165; 713/164
(58) Field of Classification Search .................. 726/26; 707/9; 713/150
See application file for complete search history.

(56) References Cited

U.S. PATENT DOCUMENTS

| | | | |
|---|---|---|---|
| 5,136,712 A * | 8/1992 | Perazzoli et al. ............. 718/104 |
| 5,146,575 A * | 9/1992 | Nolan, Jr. ..................... 711/164 |
| 5,311,591 A | 5/1994 | Fischer |
| 5,313,646 A * | 5/1994 | Hendricks et al. ........... 707/101 |
| 5,452,431 A * | 9/1995 | Bournas ....................... 711/115 |
| 5,551,051 A | 8/1996 | Silverthorn et al. |
| 5,761,669 A * | 6/1998 | Montague et al. ........ 707/103 R |
| 6,009,453 A | 12/1999 | Sakaki |
| 6,308,317 B1 | 10/2001 | Wilkinson et al. |
| 6,343,324 B1 * | 1/2002 | Hubis et al. .................. 709/229 |
| 6,347,331 B1 | 2/2002 | Dutcher et al. |
| 6,430,561 B1 * | 8/2002 | Austel et al. ...................... 707/9 |
| 6,578,078 B1 * | 6/2003 | Smith et al. .................. 709/224 |
| 6,757,698 B2 * | 6/2004 | McBride et al. ............. 707/204 |
| 6,823,458 B1 * | 11/2004 | Lee et al. ........................ 726/16 |
| 7,035,825 B1 * | 4/2006 | Sturtevant et al. .............. 705/51 |
| 2001/0025311 A1 * | 9/2001 | Arai et al. ..................... 709/225 |
| 2002/0083340 A1 * | 6/2002 | Eggebraaten et al. ........ 713/201 |
| 2002/0152262 A1 * | 10/2002 | Arkin et al. ................... 709/202 |
| 2002/0161680 A1 * | 10/2002 | Tarnoff ............................ 705/35 |
| 2003/0221124 A1 * | 11/2003 | Curran et al. ................. 713/201 |

(Continued)

OTHER PUBLICATIONS

International Search Report—PCT/US02/025750, International Searching Authority—US, Feb. 20, 2003.
International Preliminary Examination Report—PCT/US02/025750, IPEA/US, Apr. 14, 2003.
Kudo, "Free BSD Site Management Diary No. 22, Software Design," Gijyutuhyoron Corp., Jun. 18, 2001, No. 128, pp. 80-86.

(Continued)

*Primary Examiner* — Pramila Parthasarathy
(74) *Attorney, Agent, or Firm* — James T. Hagler

(57) ABSTRACT

An application's access to storage is limited on a per application basis. The application is granted access to a portion of the storage. The application may manipulate that portion of the storage by creating distinct file structures within that portion, modifying, reading and writing files contained therein. The application is denied access to the storage area outside the granted portion. Similarly, other applications stored in the storage area follow a similar paradigm. In one embodiment, the storage area is a hierarchical file structure and applications are stored as children in the file structure. The applications, however, are mapped to indicate each are stored at the root of the file structure to prevent access to other areas of the file structure. In another embodiment, the file structure supports a shared directory that multiple applications are mapped to, also as a root directory but to another drive.

17 Claims, 5 Drawing Sheets

U.S. PATENT DOCUMENTS

| | | | |
|---|---|---|---|
| 2003/0236797 A1* | 12/2003 | Nita | 707/200 |
| 2004/0010701 A1* | 1/2004 | Umebayashi et al. | 713/193 |
| 2004/0015723 A1* | 1/2004 | Pham et al. | 713/201 |
| 2004/0078568 A1* | 4/2004 | Pham et al. | 713/165 |
| 2004/0230753 A1* | 11/2004 | Amiri et al. | 711/147 |
| 2005/0197859 A1* | 9/2005 | Wilson et al. | 705/2 |

OTHER PUBLICATIONS

Mourani, G., "Securing and Optimizing Linux: A Hands on Guide for Linux Professionals" [Online] Jul. 2000, OPENDOCS LLC, XP002441533. Retrieved from the Internet: URL:http://faqs.org/docs/securing/index.html.

* cited by examiner

APPLICATION LEVEL ACCESS PRIVILEGE TO A STORAGE AREA ON A COMPUTER DEVICE

CROSS-REFERENCE TO RELATED APPLICATION

This application claims the benefit of Provisional Application No. 60/312,177, filed Aug. 13, 2001, pending, which application is incorporated herein by reference in its entirety.

FIELD OF THE INVENTION

The present invention relates to processing of applications for use in a computer device, and more particularly, to the storing of applications in a file structure and limiting the access of applications to the storage area on a computer device.

BACKGROUND

Wireless communication has experienced explosive growth in recent years. As consumers and businesses rely more on their wireless devices, such as mobile phones and personal digital assistants (PDAs), wireless service providers, i.e., carriers, strive to provide additional functionality on these wireless devices. This additional functionality will not only increase the demand for wireless devices but also increase the usage among current users.

The environment of a wireless device creates unique challenges when one considers the execution of application on a wireless device. Methods of downloading the applications and removing the applications need to be developed. In addition, there is a need for security on the wireless device. Security concerns on the wireless device include controlling the environment the best way possible so that an application cannot, intentionally or unintentionally, degrade or corrupt other files on the wireless device or the network on which the wireless device communicates.

Applications, during execution, may perform various operations such as reading, writing, and modifying files stored on the device, or accessible to the device. These files can be system files used by the device, such as device drivers, other application files or data files.

It is desirable to control the application's access to other files accessible to the device as a security measure to limit any damage an application may have on the device, or other systems connected to the device. This damage may be intended via a virus on the application or may be unintended where the application executes with poorly written code that unintentionally dominates a resource, damages other applications or data.

Currently, the only method of controlling an application's access to storage area includes defining privilege levels to users. A user may be given a privilege level that allows the user to read, write or modify files in various storage areas. This mechanism only controls access at the user level.

This practice, however, does not allow the limiting of storage access based on the application executing. While the user itself may attempt to limit the application's access to storage, applications executed by the user are all given the same access to storage as is defined to the user. Furthermore, there is no mechanism to limit the application's access to storage outside of the control of the user.

Consequently, what is needed in the art is a system and method for limiting an application's access to storage. In addition, it is preferable that such limitation be established so that the device or user of the device be unable to change the access limitation imposed on the application.

SUMMARY OF THE INVENTION

Systems and methods consistent with the present invention overcome the shortcomings of existing systems by creating a safer environment for application storage and limiting access of the application to other storage areas. Furthermore, systems and methods consistent with the present invention provide a mechanism such that the device and/or user of the device be unable to change the access limitation imposed on the application.

In one embodiment, the present invention provides a method of executing an application on a device comprising the steps of receiving a request to execute the application, determining if the application was modified, in the event the application was not modified, mapping the application to a unique storage location, granting the application access to the unique storage location, and denying a second application access to the unique storage location.

In another embodiment, the present invention provides a device having a file structure, comprising a control program to store files within the file structure, wherein the control program is operable to store multiple applications within the file structure, each application having an associated portion of the file structure and the control program is operable to grant each application access to its associated portion and deny access to each application to other associated portions of the storage area.

In yet another embodiment, the present invention provides a method for storing an application on a device, comprising the steps of receiving the application at the device, storing the application in a storage on the device, and limiting access of the application to a unique portion on the storage, independent of a user access privilege on the device. Further embodiments of the present invention are also described in the following description and attached drawings.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Figure 1:
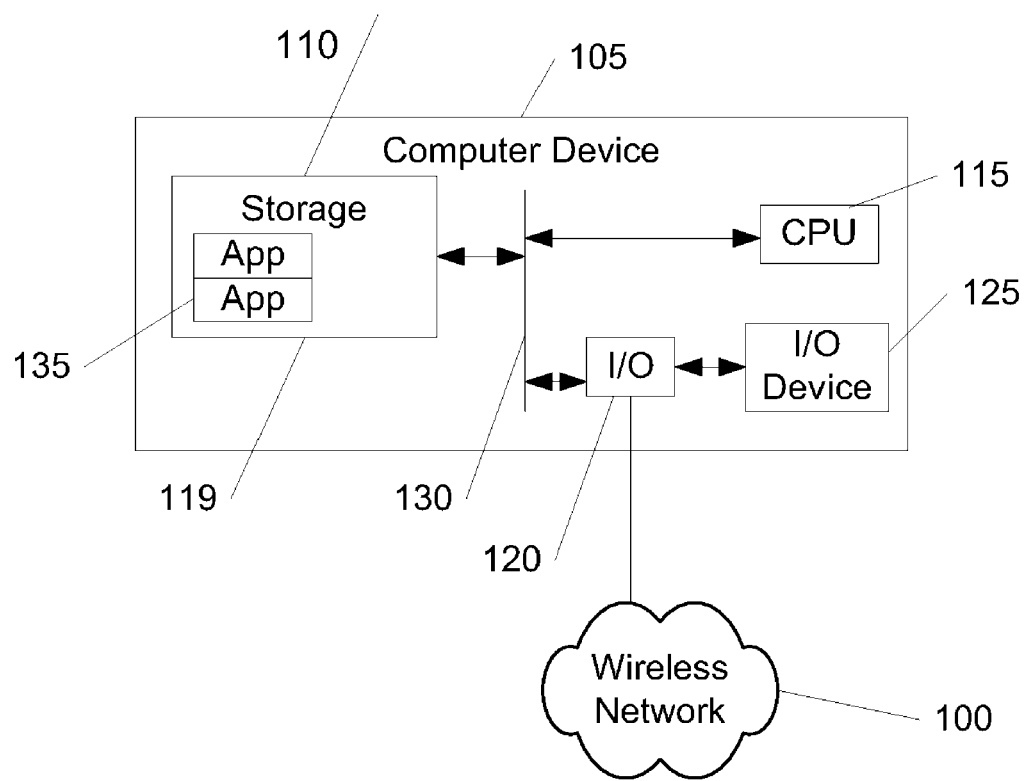
FIG. 1 is a block diagram depicting a computer device having storage in which an exemplary embodiment of the present invention may be practice.

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Introduction

The present invention limits an application's access to a storage area on a computer device. The same user on a device may install multiple applications. The user may have access to all the applications and the storage area of each application. Systems and methods consistent with the present invention, however, limit each of the application's access to areas of storage other than that allocated to the specific application. By defining this access per application and not per user, safer execution of applications can be achieved by reducing the unwanted consequence that may occur by an application overwriting or inappropriately accessing areas of storage that the application should not. This increased level of safety is provided even when the user, executing the application, has the rights to access the other storage areas that the application is prohibited from accessing.

Furthermore, systems and methods consistent with the present invention also provide for the access to shared areas of storage so that multiple applications may maintain their private and secure areas, but may also share files, such as data and libraries, with other applications.

It will be recognized to those skilled in the art that the forgoing describes an application file type being distributed and executed for simplicity of description. An "application" may also include files having executable content, such as: object code, scripts, java file, a bookmark file (or PQA files), WML scripts, byte code, and perl scripts. In addition, an "application" referred to herein, may also include files that are not executable in nature, such as documents that may need to be opened or other data files that need to be accessed.

FIG. 1 is a block diagram depicting a computer device having storage in which an exemplary embodiment of the present invention may be practice. In this exemplary embodiment, a computer device 105 contains a storage area 110, a CPU 115 and an Input/Output (I/O) interface 120 interconnected via a bus 130. It will be recognized by those skilled in the art that these are but a few of the components that may be contained in a computer device. Furthermore, many other paradigms of interconnecting various components of a computer device may be used.

The computer device 105 may interface with outside systems via a network 100 and also may receive applications or other data via of the I/O device 125 (such as via CD-ROM, smart card, or floppy disk) into the I/O interface 120. The storage area 110 of the computer device 105 is used to store data and applications received into the computer device 105. The storage area 110 may comprise a hard disk drive, flash memory or other methods of storage (not shown). Furthermore, the computer device may store other information in storage area 110, such as operating system files, resource files, configuration files, and libraries. A separate storage area, such as ROM, EPROM and RAM, however, may also be used to store these or other files.

The computer device may be a personal computer with a fixed location when connected to the network 100 or may be a mobile wireless device that may change geographic location as it is communicating with the network 100.

The applications 135 may be received by the computer device via of the network 100 or via the I/O device 125. As described above, these applications include, but are not limited to, files having executable content, such as: object code, scripts, java file, a bookmark file (or PQA files), WML scripts, byte code, and perl scripts.

The network 100 may be a landline network incorporating private and public networks, such as the Internet or may incorporate an RF network, such as that used for wireless communication.

In one embodiment of the present invention, the computing device 105 may also contain a control program, such as the BREW API developed by QUALCOMM Incorporated. A control program can be used to coordinate the storage mechanism that provides the limiting access to the applications, as disclosed herein.

Figure 2:
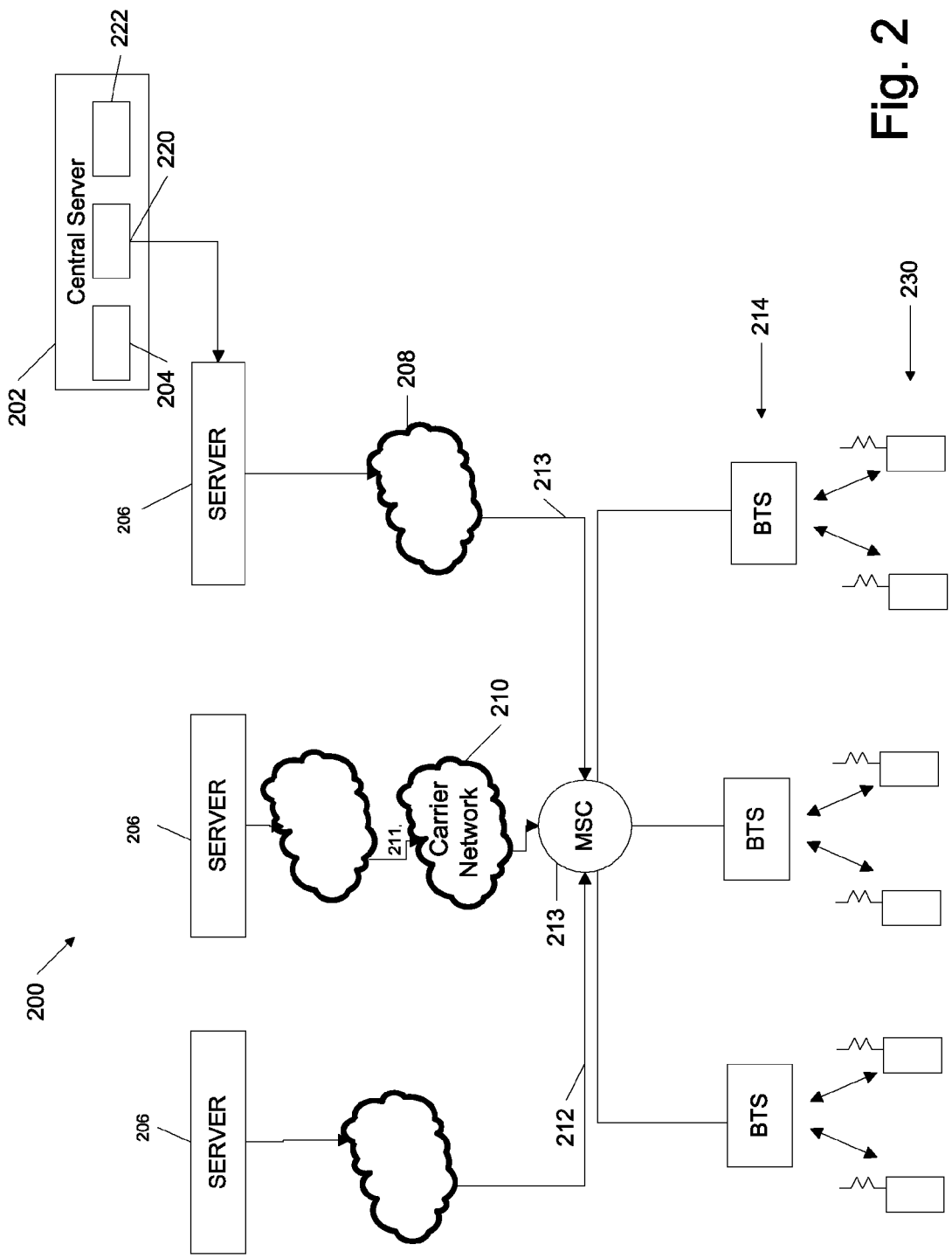
FIG. 2 is a block diagram depicting a wireless system architecture containing wireless devices having storage and application access process in an exemplary embodiment of the present invention.

FIG. 2 is a block diagram depicting a wireless system architecture containing wireless devices having storage and application access process in an exemplary embodiment of the present invention. A central server 202 is an entity that certifies, either by itself or in combination with a certification server, the application programs as compatible with a defined set of programming standards or conventions. As described earlier, these programming standards may be established so that the application will execute on a BREW™ software platform, developed by QUALCOMM Incorporated.

In one embodiment, the central server database 204 consists of a record of the identifications for each application program downloaded at any time onto each wireless device 230 in the network 200, an Electronic Service Number ("ESN") for the individual who downloaded the application program, and a Mobile Identification Number ("MIN") unique to the wireless device 230 carrying that application program. Alternatively, the central server database 204 contains records for each wireless device 230 in the network 200 of the wireless device model, wireless network carrier, the region where the wireless device 230 is used, and any other information useful to identify which wireless device 230 are carrying which application programs. In addition, the central server database may also store this developer identifying information associated with an application.

The central server 202 communicates with one or more computer servers 206, over a network 208, such as the Internet (preferably secured). The servers 206 also communicate with a carrier network 210 via a network 208. The carrier network 210 communicates with the MSC 212 by both the Internet and POTS (plain ordinary telephone system). The Internet connection 211 between the carrier network 210 and the mobile switching center (MSC) 212 transfers data, and the POTS 213 transfers voice information. The MSC 212, in turn, is connected to multiple base stations ("BTS") 214. The MSC 212 is connected to the BTS by both the Internet 211 (for data transfer) and POTS 213 (for voice information). The BTS 214 sends messages wirelessly to the wireless devices 230 by short messaging service ("SMS"), or any other over-the-air method.

The above network may be used to send an application to a computer device, such as the wireless device 230. The application, in one embodiment, has a unique identifier to distinguish it from other applications or files and a digital signature to detect modifications to the application. This digital signature may be bound to the application and stored on the wireless device either bound or separate, but still associated with, the application. The application is sent to the wireless device from the central server to one of the various servers 206 through the MSC and BTS to the wireless devices 230.

Figure 3:
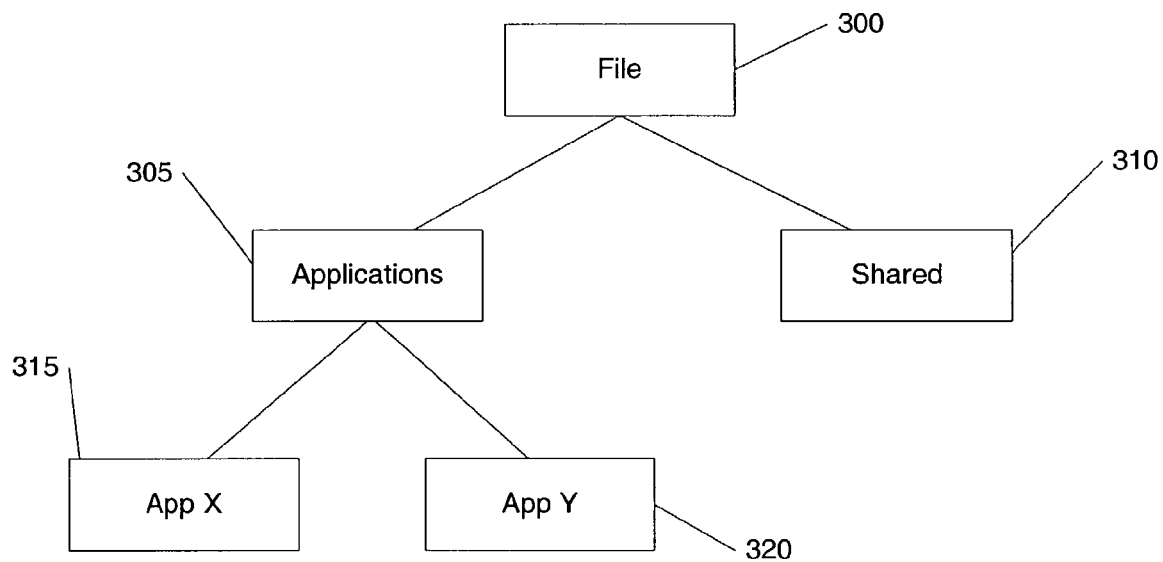
FIG. 3 is a block diagram depicting a file structure used in the implementation of an exemplary embodiment of the present invention.

FIG. 3 is a block diagram depicting a file structure used in the implementation of an exemplary embodiment of the present invention. On a computer device having a storage area, one embodiment of the present invention creates a file structure to aid in limiting access of the applications to the storage areas. This structure in FIG. 3 depicts a hierarchical file structure, however, it will be recognized by those skilled in the art that many file structures may be used to implement systems and methods that limit an application's access to a storage area as describe herein.

In this embodiment, the root of the file structure defines the files to be stored in this portion of the storage area. Subdirectories to the File root directory 300 include Applications 305 and Shared 310. As the computer device receives applications, they are stored in subdirectories (e.g., App X 315 and App Y 320) under the Applications directory 305. It will be recognized by those skilled in the art that this hierarchical structure can be structured in many ways using various subdirectory schemes while still implementing the present invention.

In one embodiment of the present invention, the permissions associated with each of the applications are stored in the Applications directory 305. These permissions may be used to grant the application rights to specific files, such as APIs, data and libraries.

It is preferable that each application has a unique identifier associated with it and this unique identifier be used to create the individual applications' subdirectories under Applications subdirectory 305. In one embodiment, each application has a unique name and the subdirectory is created using the name of the applications.

As each application is stored under the Application subdirectory 305, a mapping is created and associated with each application. This mapping prevents the application from accessing other areas of the file structure. In one embodiment, App X subdirectory 315 is mapped to a root directory with respect to App X's calls to the storage area. For example, from App X's perspective, it is stored at a root directory in the file structure even though in actuality, it is a subdirectory. In this embodiment, by mapping the App X subdirectory 315 to a root directory, calls from App X cannot access any of the files outside of the App X 315 directory. App X can, however, access the App X subdirectory 315 and any subdirectories (not shown) under the App X subdirectory 315. Consequently, under this implementation, App X cannot access the Files root directory 300, the Applications subdirectory 305 or, importantly, App Y subdirectory 320.

Similarly, within the same device accessed by the same user, when the computer device receives App Y, it is stored under the Applications subdirectory 305 in the App Y subdirectory 320. As with App X, a mapping is created with App Y such that it appears to App Y that it is stored at the root directory. This limits access of App Y to just the App Y subdirectory 320 and any subdirectories under it (not shown). This file structure and mapping scheme provides the advantage, similar as with App X, of preventing App Y from accessing other parts of the file structure.

Consequently on the computer device, applications may be granted access to files based on the specific applications and not based solely on the access privilege level of the user using the computer device.

Mapping the applications directory as a root directory in the file structure is one embodiment of the present invention and it will be recognize by those skilled in the art that other paradigms exist, such as semaphores, permission lists, and other techniques used to limit an, applications access to the storage area.

In another embodiment of the present invention, it is anticipated that it may be desirable to share files, such as data or libraries, among applications. Therefore, in such instances, it is preferred to establish a shared directory 310 and include a mapping of the shared directory to each of the applications that want to share data. It is also preferable that this shared data be mapped to the applications such that it exists at a root directory, for example, of a separate drive. Mapping the shared directory 310 as a root directory will prevent each of the applications' access to the parent directories of the shared directory and consequently to any subdirectories to the parent directories of the shared directory.

In addition, it is preferred that digital signatures are associated with the unique identifier, such as the application name described above. By using digital signatures, or some other modification detection technique, it may be detected whether an application modifies the unique identifier by which the subdirectory is created. The modification detection and/or prevention creates a safer system by providing an indication when an application is acting inappropriately, such as renaming itself the name of another application to access it's subdirectory. For example should App X rename itself App Y, and should the system allow a remapping based on the name, i.e., the unique identifier in this case, App X would then have access to App Y's files.

Figure 4:
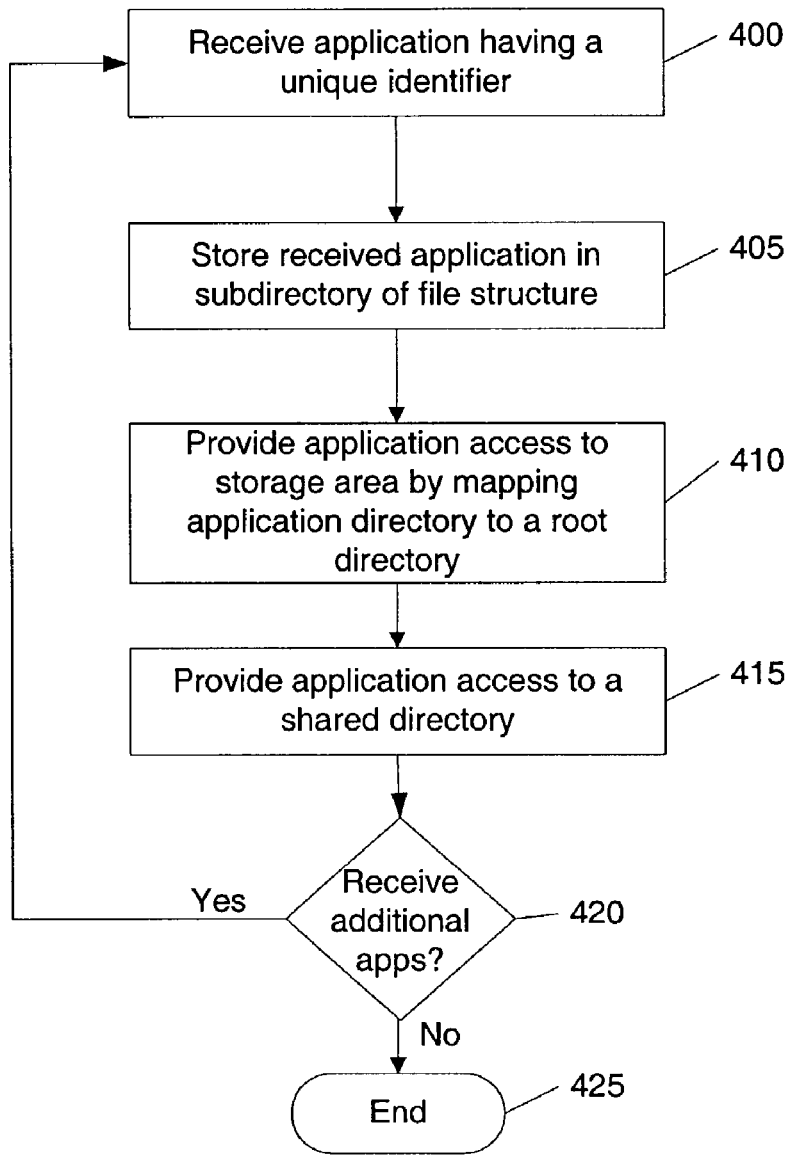
FIG. 4 is a flowchart depicting the process of storing an application that limits access of an application to the storage area of a device in an exemplary embodiment of the present invention.

FIG. 4 is a flowchart depicting the process of storing an application that limits access of an application to the storage area of a device in an exemplary embodiment of the, present invention. The process begins by receiving an application having a unique identifier. (Step 400). The process may be controlled by a control program that provides some direction on the storage and mapping -of the received applications. In one embodiment, the control program is a BREW™ API developed by QUALCOMM Incorporated running on a wireless device.

In one embodiment, the unique identifier is the application name. In this embodiment, applications sent to or received by the computer device need to be monitored such that the same application name is not sent to or received by the computer device. Other identifiers may be used and it is recognized by one skilled in the art how to monitor incoming applications to determine if a duplicate identifier exists.

The process proceeds to store the received application in a subdirectory in the file structure (Step 405). This may include creating the subdirectory using the unique identifier received with the application. The process then creates a mapping of the application subdirectory as root directory (Step 410). Consequently when the application is executing, it appears to the application that it is located at a root directory.

The process then proceeds to provide the application access to a shared directory by creating a mapping of another root directory to the shared directory (Step 415). This shared directory may be set up so that multiple applications have access to this directory for the sharing of files, such as data and libraries.

If the computer device receives a subsequent application (step 420), the process repeats but creates a separate subdirectory for the subsequent application based on the unique identifier. Consequently, it appears to the subsequent application that it is located at a root directory. Furthermore, it may be mapped to the same shared directory as the previous application was mapped for the sharing of files.

If no additional applications are received, the process ends (Step 425).

Figure 5:
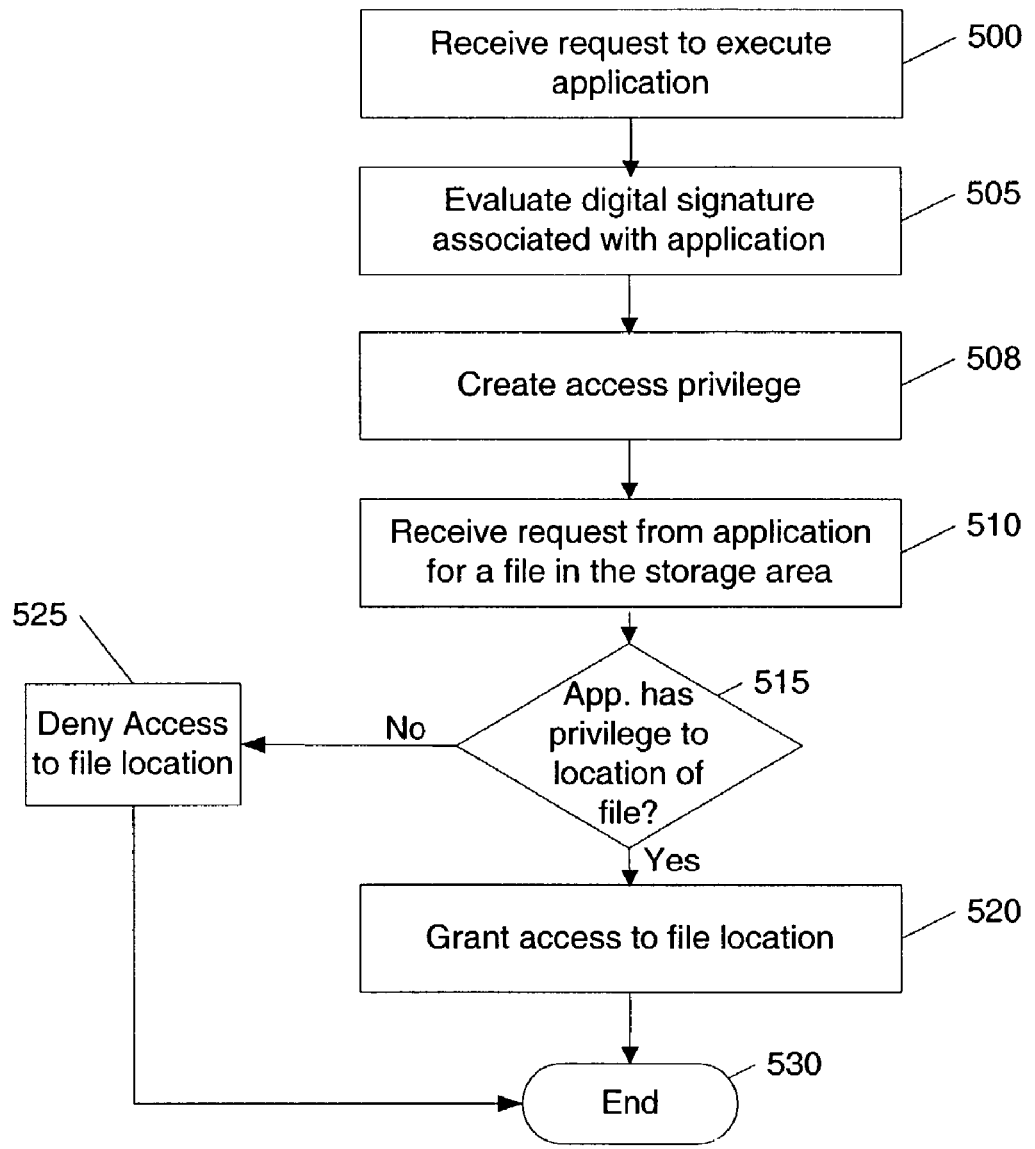
FIG. 5 is a flowchart depicting the process of limiting access of application to a storage area in an exemplary embodiment of the present invention.

FIG. 5 is a flowchart depicting the process of limiting access of application to a storage area in an exemplary embodiment of the present invention. The process begins by receiving a request to execute an application on a computer device (Step 500). This request may be made by a user via a user input or may be made by another application either on the computer device or connected to the computer device, such as via a network.

In one embodiment, the application has a digital signature associated with the application to detect modifications. In this embodiment, the process proceeds to evaluate the digital signature associated with the application (Step 505). If the application was modified, as determined by the digital signature the computer device may choose many courses of action, including any one or many of the following: denying execution of the application, informing the user of the modified application, notifying the computer device monitoring system of the modified application, or notifying a server or other computer system of the modified application.

If the application is not modified, the process creates access privileges to the application (Step 508). These privileges may be created by using the mapping process described above with respect to FIGS. 3 and 4. Other privilege schemes, however, may be used to define privilege rights of the application to the storage areas on the device.

During the execution of the application, the application may receive a request from to access to a storage area (Step 510). For example, the application may request to perform a read, write or modify operation on a file located in the storage area. Such files may include those files that control resources of the computer device. The computer device determines if the application is granted privilege to the location of the file (Step 515). If the mapping paradigm is used above, the computer system determines the privilege by virtue of the fact that the application cannot access files above the root directory to which the application is mapped.

If the application has privilege to the file's location as determined in Step 515, then the application is granted access to the file (Step 520). If the application is not permitted access to the file's location, access is denied (Step 525) and the process ends (Step 530).

CONCLUSION

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; or other forms of RAM or ROM. The scope of the invention is defined by the claims and their equivalents.

What is claimed is:

1. A method for controlling access by an application to a storage area of a wireless device upon which the application is running, the method comprising:
    associating a file structure with the storage area, said file structure being hierarchical and comprising a root directory node, said root directory node being a highest hierarchical member of said file structure and an initial point for accessing directories and files of said file structure, and a plurality of intermediate directory nodes, each of said intermediate directory nodes being within a hierarchy of said root directory node;
    storing the application within the file structure, the storing including:
        associating one of said plurality of intermediate directory nodes of said file structure associated with said storage area with said application, said application comprising at least one file; and
        storing each file of said application in said associated intermediate directory node of said file structure associated with said storage area; and
    executing said application while limiting a file structure access ability of said application to only a portion of said file structure within a hierarchy of said associated intermediate directory node of said file structure associated with said storage area, said portion of said file structure including each file of said application, wherein in said step of executing, said file structure access ability of said application is limited by remapping, for said application, said associated intermediate directory node as the root directory node of the file structure.

2. The method of claim 1, wherein the storing of said application is performed by an application programming interface on a wireless device and the storing further comprises:
    designating one of said plurality of intermediate directory nodes as a shared area of said file structure; and
    permitting said application to also access said shared area by remapping said shared area into hierarchy of said associated intermediate directory node.

3. The method of claim 1, further comprising before said step of executing:
    (a) determining a first condition of whether said application has been modified as true or false;
    (b) after step (a), if said first condition is true, proceeding to said step of executing;
    (c) after step (a), if said first condition is not true, taking corrective action without proceeding to said step of executing.

4. The method of claim 3, wherein said application is associated with a digital signature and said step of determining includes analyzing said digital signature.

5. The method of claim 3, wherein said step of taking corrective action comprises:
    displaying an indication that said application has been modified.

6. A method for controlling access by an application to a storage area of a wireless device upon which the application is running, the method comprising:
    associating a file structure with the storage area, said file structure being hierarchical and comprising a root directory node, said root directory node being a highest hierarchical member of said file structure and an initial point for accessing directories and files of said file structure, and a plurality of intermediate directory nodes, each of said intermediate directory nodes being within a hierarchy of said root directory node;
    storing the application within the file structure, the storing including:
        associating one of said plurality of intermediate directory nodes of said file structure associated with said storage area with said application, said application comprising at least one file; and
        storing each file of said application in said associated intermediate directory node of said file structure associated with said storage area; and executing said application while limiting a file structure access ability of said application to only a portion of said file structure within a hierarchy of said associated intermediate directory node of said file structure associated with said storage area, said portion of said file structure including each file of said, wherein in said step of executing, said file structure access ability of said application is limited by setting a permission list associated with said application and enforced by a permission based access control mechanism to permit access to only include a portion of said file structure within a hierarchy of said associated intermediate directory node.

7. The method of claim 6, further comprising before said step of executing:
(a) determining a first condition of whether said application has been modified as true or false;
(b) after step (a), if said first condition is true, proceeding to said step of executing;
(c) after step (a), if said first condition is not true, taking corrective action without proceeding to said step of executing.

8. The method of claim 7, wherein said application is associated with a digital signature and said step of determining includes analyzing said digital signature.

9. The method of claim 7, wherein said step of taking corrective action comprises displaying an indication that said application has been modified.

10. A method for controlling application access to a storage area of a wireless device upon which the application is running, the method comprising:
associating a file structure with the storage area, said file structure being hierarchical and comprising a root directory node, said root directory node being a highest hierarchical member of said file structure and an initial point for accessing directories and files of said file structure, a first plurality of first intermediate directory nodes, each of said first intermediate directory nodes being within a hierarchy of said root directory node, and a second plurality of second intermediate directory nodes, each of said second intermediate directory nodes being within a hierarchy of a first one of said first intermediate directory nodes;
storing a second plurality of applications within the file structure, the storing including:
associating each of said second intermediate directory nodes of said file structure associated with said storage area with the second plurality of applications; and
for each of said second plurality of applications, respectively storing files of each application in an associated one of said plurality of second intermediate directory nodes of said file structure associated with said storage area; and
executing a selected application selected from said second plurality of applications while limiting a file structure access ability of said selected application to only a portion of said file structure within a hierarchy of said second intermediate directory node which is associated with said selected application, said portion of said file structure including files of said selected application.

11. The method of claim 10 wherein in said step of executing, said file structure access ability of said selected application is limited by remapping, for said selected application, said associated second intermediate directory node as the root directory node of the file structure.

12. The method of claim 10 wherein in said step of executing, said file structure access ability of said selected application is limited by setting a permission list associated with said selected application and enforced by a permission based access control mechanism to permit access to only to a portion of said file structure within a hierarchy of said associated second intermediate directory node.

13. The method of claim 10 wherein the storing further includes:
designating a second one of said plurality of first intermediate directory nodes as a shared area of said file structure; and
permitting said selected application to also access said shared area by remapping said shared area into hierarchy of said associated second intermediate directory node.

14. A wireless device, comprising:
a bus;
a processor, coupled to said bus;
a wireless interface, coupled to said bus;
a storage device, coupled to said bus, said storage device being associated with a file structure, said file structure being hierarchical and comprising:
a root directory node, said root directory node being a highest hierarchical member of said file structure and an initial point for accessing directories and files of said file structure;
a first plurality of first intermediate directory nodes, each of said first intermediate directory nodes being within a hierarchy of said root directory node; and
a second plurality of second intermediate directory nodes, each of said second intermediate directory nodes being within a hierarchy of a first one of said first intermediate directory nodes; and
a control program contained within a computer-readable medium, which when executed by the processor is operable to store an application within the file structure and is further operable to:
associate each of said second intermediate directory nodes of said file structure associated with said storage device with a respective one of a second plurality of applications;
for each of said second plurality of applications, respectively storing files of each application in an associated one of said plurality of second intermediate directory nodes; and
execute a selected application selected from said second plurality of applications while limiting a file structure access ability of said selected application to only a portion of said file structure within a hierarchy of said second intermediate directory node which is associated with said selected application, said portion of said file structure including files of said selected application.

15. The wireless device of claim 14 wherein the file structure access ability of said selected application is limited by remapping, for said selected application, said associated second intermediate directory node as the root directory node of the file structure.

16. The wireless device of claim 15 wherein the file structure access ability of the selected application is limited by setting a permission list associated with said application and enforced by an permission based access control mechanism to permit access to only include a portion of said file structure within a hierarchy of said associated intermediate directory node.

17. A non-transitory computer-readable storage medium having stored thereon processor-executable instructions configured to cause a processor of a wireless device to perform operations comprising:

associating a file structure with a storage area of a wireless device, said file structure being hierarchical and comprising a root directory node, said root directory node being a highest hierarchical member of said file structure and an initial point for accessing directories and files of said file structure, and a plurality of intermediate directory nodes, each of said intermediate directory nodes being within a hierarchy of said root directory node;

storing the application within the file structure, the at least one instruction to store including:

associating one of said plurality of intermediate directory nodes of said file structure associated with said storage area with said application, said application comprising at least one file; and storing each file of said application in said associated intermediate directory node of said file structure associated with said storage area; and executing said application while limiting a file structure access ability of said application to only a portion of said file structure within a hierarchy of said associated intermediate directory node of said file structure associated with said storage area, said portion of said file structure including each file of said application.

* * * * *